No. 777,543. PATENTED DEC. 13, 1904.
G. R. RICH.
DRILL.
APPLICATION FILED MAY 1, 1903.
NO MODEL.
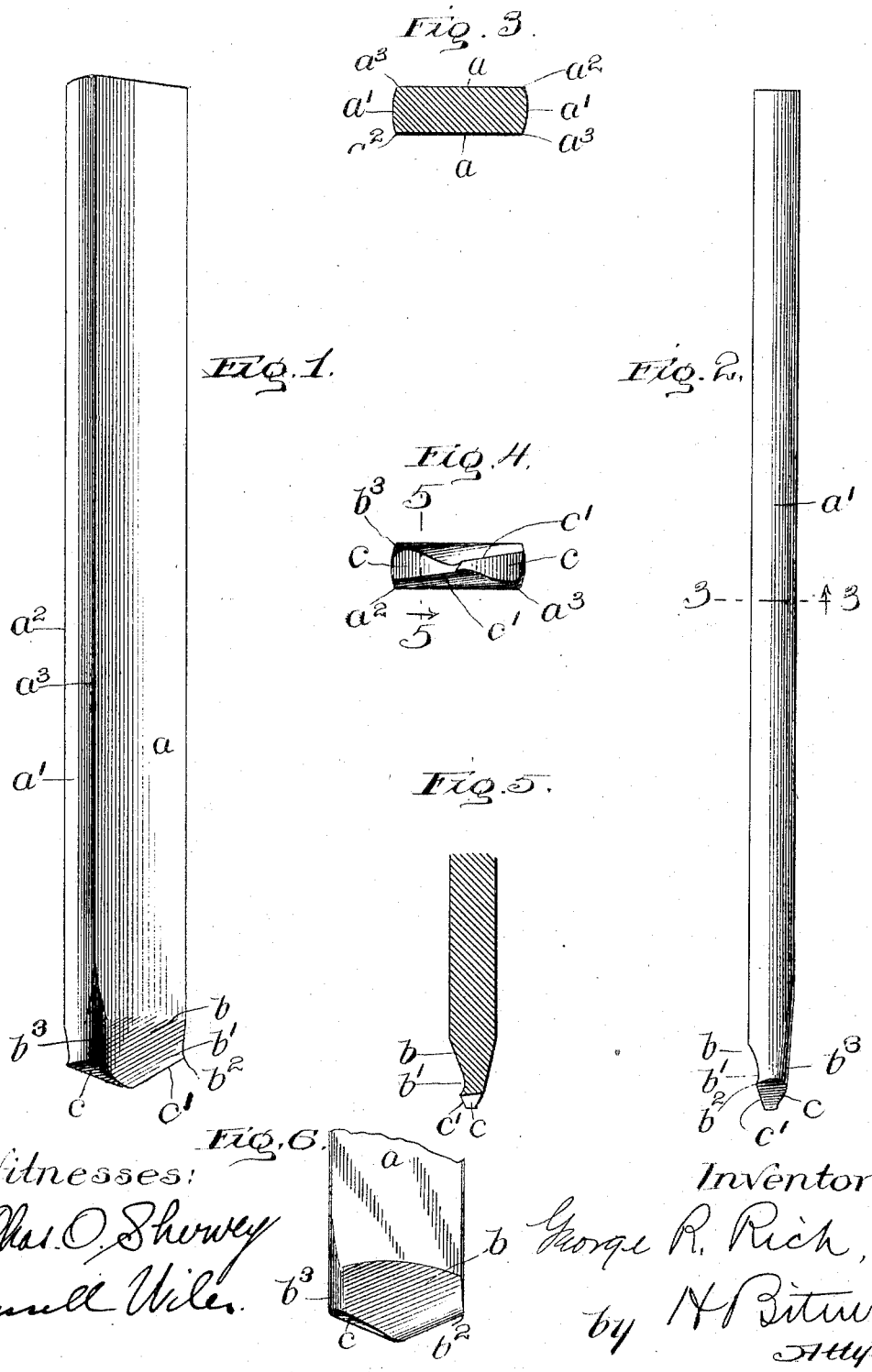
Witnesses:
Chas. O. Shirvey
Russell Wiler
Inventor:
George R. Rich,
by H. Bitner
Atty No. 777,543. Patented December 13, 1904.

UNITED STATES PATENT OFFICE.

GEORGE R. RICH, OF CHICAGO, ILLINOIS, ASSIGNOR TO GEO. R. RICH MANUFACTURING COMPANY, OF CHICAGO, ILLINOIS, A CORPORATION OF ILLINOIS.

DRILL.

SPECIFICATION forming part of Letters Patent No. 777,543, dated December 13, 1904.

Application filed May 1, 1903. Serial No. 155,109. (No model.)

*To all whom it may concern:*

Be it known that I, GEORGE R. RICH, a citizen of the United States of America, residing at Chicago, in the county of Cook and State of Illinois, have invented certain new and useful Improvements in Drills, of which the following is a specification.

My invention relates to certain improvements in drills, the object of which is to produce a drill having a greatly-increased capacity for speed in cutting holes in metal or in reaming out those which have been already formed.

In the use of the latest and best kinds of grades of steel for cutting-tools—such, for instance, as that which is commonly known as "self-hardening" steel—it is possible to cut at a speed which raises the temperature of the tool to a dull-red heat without loss of efficiency in the cutting edge. To cut at any such speed as this, enormous pressure is required, and it has become quite a problem how to provide the necessary strength in the drill to withstand the strain due to this excessive pressure. The pressure upon the tool of course determines the speed at which the drill advances, and the maximum pressure which the drill will stand therefore fixes the limit of speed which can be attained. "Self-hardening" steel is so termed because it requires no tempering for use in cutting, and steel of this kind can be annealed only with the greatest difficulty, and even then only to a limited degree. Consequently it is important that the steel be shaped as nearly as possible to the form of the drill in rolling to avoid as much as possible any cutting or unnecessary grinding. To cut steel of this sort as is customary in twist or fluted drills would necessitate such frequent sharpening of the milling-cutters as to make the drills too expensive for use. Furthermore, it is well known that any cutting or working of steel after it is first rolled into shape destroys what is known as the "skin" strength of the metal, which is the greatest strength it possesses, and working other than cutting disarranges the fibers of the steel and weakens the same very materially.

In working a drill the strain put upon it by the pressure and the work is, first, a buckling strain, caused by the pressure alone, tending to snap the drill off squarely across, and, second, a torsional strain, caused by combination of the longitudinal thrust and the twist of the work, which tends to split the drill approximately parallel with its longitudinal axis. This torsional strain renders a twist-drill or fluted drill unsuitable for rapid cutting involving great longitudinal pressure, because the drill is liable to split along the grooves or channels formed therein.

To meet all of the various requirements due to the new conditions attendant upon the use of self-hardening steel cutting at great speed, I have selected a form of rolled metal which lends itself admirably to the production of a drill, affording the necessary clearance combined with the maximum strength in the directions necessary, and I have provided upon this extreme end a point or cutting edge involving the least possible grinding away of the metal and limiting the destruction of the skin strength thereto to within an extremely short distance of the point of the drill. The drill thus formed has shown itself to be exceedingly efficient, to have a greatly increased capacity for speed, and to be practically indestructible, working at any speed up to that which brings the point to a dull-red color. As drilling, reaming, and boring form a considerable part of the operations usually performed upon metal, this drill has proven to be a remarkable advance in one of the arts in which much improvement would hardly be expected.

The preferred form of the invention will be illustrated and specifically described, and the essential features thereof will be pointed out in the claims at the end of this specification.

A further advantage of this drill is the fact that the skin strength of the metal is preserved down to within an exceedingly short distance of the point and the arrangement of the fiber of the metal is not disturbed in any portion of the drill. Danger of breakage under torsional as well as buckling strain depends largely upon the length of the unsupported portion of the drill. In the use of this drill in the boring of short holes the drill can be supported up to within a short distance of the point, and in boring long holes all of the drill, except at the extreme point, has the maximum strength of the metal as it comes from the rolls.

In the drawings, Figure 1 is a perspective of my improved drill. Fig. 2 is an edge view thereof. Fig. 3 is a section in the line 3 3 of Fig. 2. Fig. 4 is an end view of the point. Fig. 5 is a section in the line 5 5 of Fig. 4 looking in the direction of the arrow, and Fig. 6 is a side view of the sharpened end.

The drill consists of a bar of steel, which, except at the point, is of uniform cross-section, the cross-section being clearly shown in the drawings. To be more particular, the drill has two parallel faces $a\ a$ and two curved faces $a'\ a'$. The curves of these sides are such that two of the diagonally-opposite corner-lines of the drill are farther removed from the center thereof than are the other corners or any parts of the curves between them. Referring to Fig. 3, the corners $a^2\ a^2$ are farther from the center of the drill than are the corners $a^3\ a^3$ or than other portions of the curved faces $a'\ a'$. The point of the drill is formed by grinding away two faces $b$ on opposite sides of the drill, forming a slight groove $b'$ therein, so as to leave an overhanging point $b^2$ adjacent to the corners $a^2\ a^2$ of the drill, which, it will be remembered, are farthest removed from the center thereof. The end of the drill is ground off to form two faces $c\ c$, and the grooves $b'$ run substantially parallel to these faces, so that overhanging cutting edges $c'\ c'$ are formed, and inasmuch as the surfaces $c$ are at acute angles to the length of the drill the cutting edges are more advanced than are any other portions of the surfaces $c\ c$. The end portions of the corner-lines $a^3\ a^3$ of the drill—that is, the corners opposite the points $b^2$ and the cutting edges $c'$—are rounded off at $b^3$, as shown.

My improved drill is preferably formed of a bar of what is termed "self-hardening" steel.

My improved drill has several advantages over the forms heretofore in use. The first is that it is made of substantially the same cross-section throughout its length, all of the lines which are elements of its surfaces being straight and substantially parallel lines, and that it is made with opposite parallel faces. A drill which is of substantially the same cross-section throughout its length and can be fed forward continuously as its point is worn has many advantages over other types of drills, the chief of which is that the drill can be grasped close to its point by a chuck, and consequently a great deal of torsional strain can be avoided. In this way the drill of uniform cross-section can be run at higher speeds and with a greater feed than can other drills without danger of breaking from torsion.

I am aware that drills of uniform cross-section have heretofore been made; but their cross-section has been such that it has been extremely difficult to make them, and their price has made them a commercial failure. By using the new form herein shown it is possible to construct a drill having the advantage above pointed out for a drill of uniform cross-section which can be made at a sufficiently low price to be commercially successful and which will have greater strength, weight for weight, than other drills. A further advantage lies in the fact that the curved edges of the drill are made with the corners which are forward as the drill is rotated farther removed from the center than are the other corners. In this way clearance is obtained. The curved faces are necessary instead of squared ones, for the reason that if a drill rectangular in cross-section is used the strain upon the cutting-corners is such that the drill breaks under heavy pressure, just as a twist-drill does when forced to cut too rapidly.

Another and very great advantage of this drill consists in the fact that it can be constructed of self-hardening steel. This form is the only form in which a drill of self-hardening steel can be made without making the cost of construction so high as to make it a commercial failure.

I claim as new and desire to secure by Letters Patent—

1. A drill having a uniform cross-section and opposite parallel plane faces.

2. A drill having a uniform cross-section, having opposite parallel plane faces and opposite curved edges.

3. A drill having uniform cross-section, having opposite parallel plane faces, and opposite curved edges, two of the diagonally opposite corners of said drill being farther removed from the center thereof than the remaining two corners.

4. A drill of uniform cross-section, having opposite parallel plane faces and opposite curved edges, two of the diagonally opposite corners of the drill being farther removed from the center thereof than the remaining corners, and the point of said drill being undercut near the end of the corner-lines to form overhanging cutting-points.

5. A drill of uniform cross-section having opposite parallel plane faces, and opposite curved edges, said drill being provided with a suitably-ground point and said drill being composed of self-hardening steel.

6. As a new article of manufacture, a drill composed of a flat rolled bar of self-hardening steel, the flat sides of said bar remaining in the same condition as they come from the rolls, except adjacent to the point of the drill and having adjacent to said point oblique, oppositely-inclined grooves and a pointed end composed of oblique faces substantially parallel with said grooves.

In witness whereof I have signed the above application for Letters Patent, at Chicago, in the county of Cook and State of Illinois, this 27th day of April, A. D. 1903.

GEORGE R. RICH.

Witnesses:
CHAS. O. SHERVEY,
RUSSELL WILES.